Figure 1:
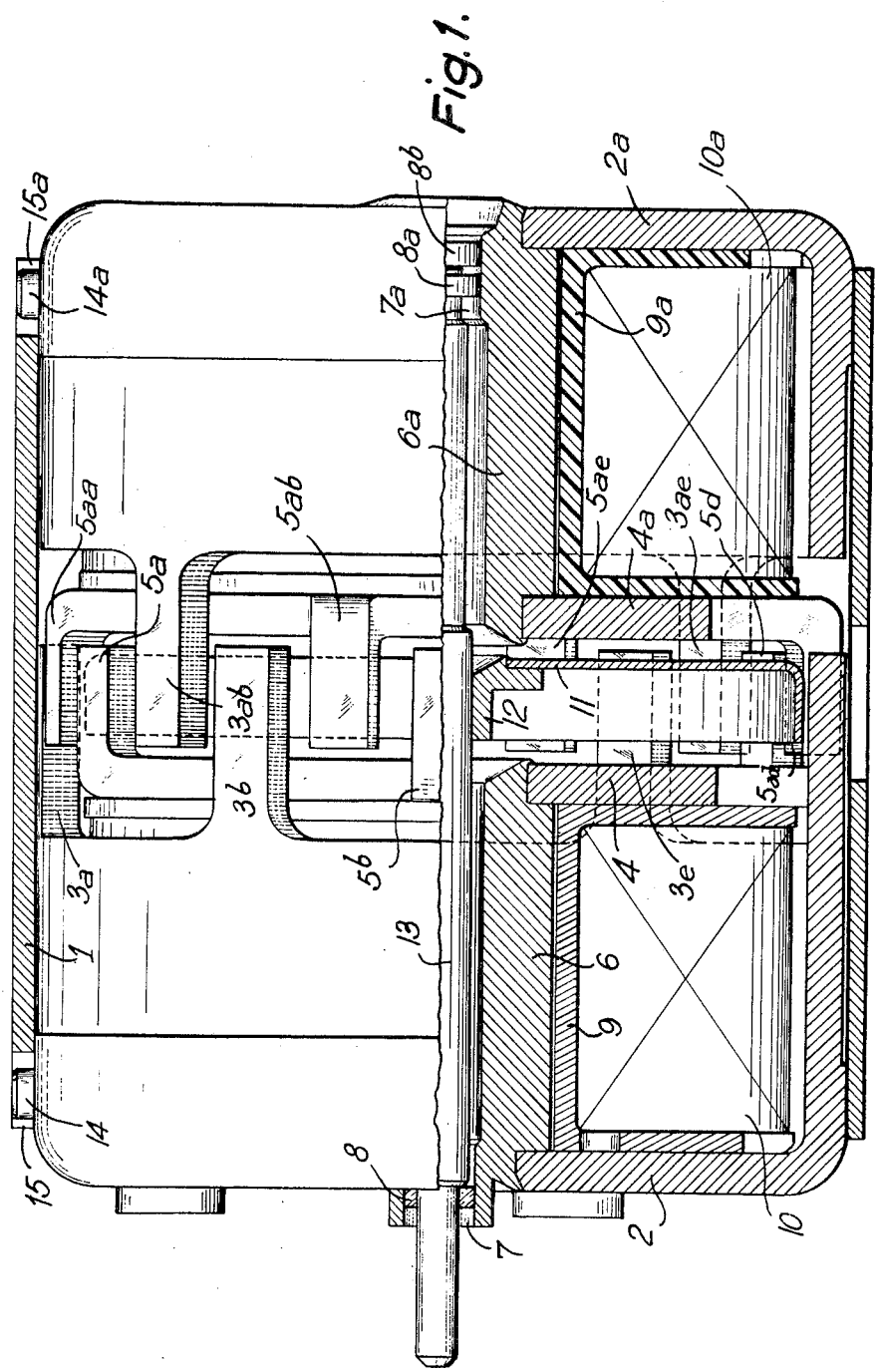

Nov. 23, 1965 P. A. E. KIEFFERT 3,219,862
SYNCHRONIZABLE ASYNCHRONOUS HYSTERESIS TYPE MOTOR
Filed Sept. 12, 1962 2 Sheets-Sheet 1

United States Patent Office 3,219,862
Patented Nov. 23, 1965

3,219,862
SYNCHRONIZABLE ASYNCHRONOUS HYSTERESIS TYPE MOTOR
Pierre Albert Ernest Kieffert, Neuilly-sur-Seine, France, assignor to Etablissements Ed. Jaeger, Levallois-Perret, Seine, France
Filed Sept. 12, 1962, Ser. No. 223,131
Claims priority, application France, Sept. 15, 1961, 873,258, Patent 1,307,361
7 Claims. (Cl. 310—162)

This invention pertains to asynchronous hysteresis motors.

The starting of asynchronous motors at present requires the use of complex, cumbersome and costly devices.

An object of the invention is to provide an inexpensive self-starting and synchronizing asynchronous hysteresis motor.

The invention contemplates the automatic starting of asynchronous hysteresis type motors and their automatic placing in synchronism by dividing the induction field into two equal and independent elemental alternating fields. One of these fields is outphased with reference to the other by means of coils. One of the coils has its former made of conductive material and the other of insulating material, for example. The sense of the outphasing is adjusted to ensure motor rotation in one direction or the other.

More particularly the invention provides a synchronized asynchronous hysteresis type multiple-pole motor comprising a rotor made of magnetic material endowed with hysteresis. The periphery of the rotor is positioned concentrically and level with the internal faces of peripheral longitudinal poles associated with two similar half-stators disposed on either side of the rotor. The half-stators are angularly shifted relative to each other by a polar half-pitch and include a means for outphasing the independent magnetic fields they generate.

Each half-stator preferably consists of an outer armature and an inner armature close to the rotor. The half-stators are interconnected by a common core on which is mounted a coil whose former, associated with one half-stator is made of conductive material while the former of the coil associated with the other half-stator is of dielectric material. The rotor can with advantage be a cup made of special steel.

Other objects, features and advantages of the invention will be apparent from the following detailed description when read with the accompanying drawings, which show, by way of example and not limitation, the now preferred embodiment of the invention.

Figure 2:
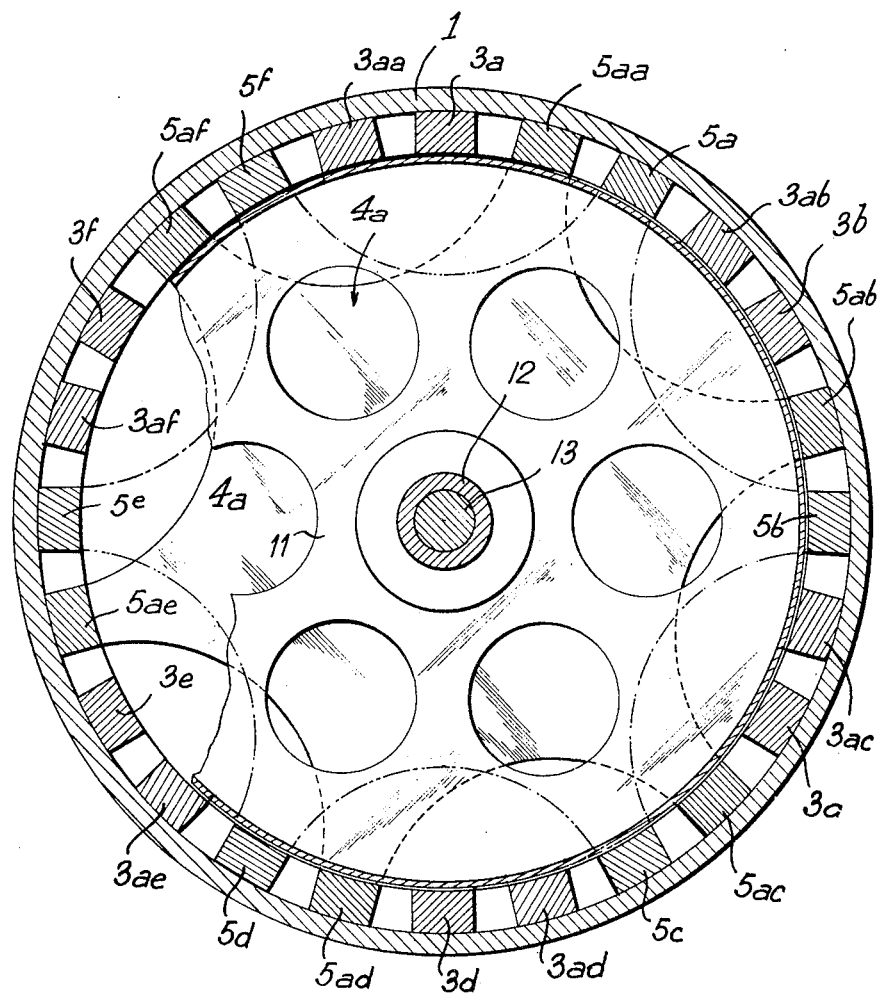

In the drawings filed herewith:

FIGURE 1 is a side elevation of a synchronized asynchronous hysteresis motor in accordance with this invention, the upper half of the drawing showing the casing cut away and the lower half being a diametrical half-sectional view, and FIGURE 2 is a cross-sectional view of FIGURE 1, taken through a central plane.

In the preferred embodiment illustrated in the figures, the synchronized asynchronous hysteresis motor comprises a casing consisting of a tube 1 within which are housed two half-stators and a rotor. Each half-stator comprises an external armature 2, 2a provided with six longitudinal extensions forming six poles which are regularly spaced at 60°. The poles of armature 2 are denoted by reference numerals 3a to 3f and those of armature 2a by 3aa to 3af. Each half-stator further comprises an inner armature 4, 4a provided with six longitudinal peripheral extensions which form six poles regularly spaced at 60°. The poles of armature 4 are designated by reference numerals 5a to 5f and those of armature 4a, 5aa to 5af. Armatures 2, 4, 4a and 2a are mutually shifted angularly and successively by 15°. The poles interleave as shown in FIGURE 2.

Armatures 2 and 4 are interconnected by a core 6, and bear against terminal seats thereof. Core 6 is provided with a cylindrical recess 7 in which is mounted a bearing 8.

About core 6 is mounted a coil having a former 9 and winding 10. Former 9 is made of conductive material such as copper or aluminum alloy known by the trade name "Duralumin."

Armatures 2a and 4a are interconnected by a core 6a and bear against terminal seats thereof which are inset thereinto. Core 6a is provided with a cylindrical recess 7a inside which are mounted a bearing 8a and a thrust bearing 8b. About core 6a is mounted a coil having a former 9a and a winding 10a. Former 9a made of a dielectric material such as a synthetic material and more particularly of polyacrylic resin such as that known by the trade name "Plexiglas".

Between the two half-stators and inside the housing provided between their interleaving poles is disposed a rotor. The rotor comprises a special steel cup 11 carried by a part 12 driven onto a shaft 13. Shaft 13 rotates in the bearings 8 and 8a and thrusts against thrust bearing 8b which acts as a counter pivot. The periphery of cup 11 is located concentrically and level with the internal pole faces. The half-stators are retained angularly within tube 1 by pins 14 and 14a which engage in terminal grooves 15 and 15a of tube 1.

The motor as hereinbefore described operates on single-phase alternating current and more particularly on 50, 60 or 400 cycle currents. It starts as an asynchronous, hysteresis type, rotating-field motor. After starting it runs as a synchronous motor.

Indeed, coils 10 and 10a, which are connected in series, generate an alternating magnetic field in each half-stator. By reason of the self-induction effect produced by the metal former 9 of winding 10, these two fields, which are independent of each other, are mutually out of phase. The two out of phase fields combine and form a rotating field which acts upon the magnetic fields induced in rotor 11 and subsisting by a hysteresis effect. This generates a torque. Rotor 11 is driven up to synchronism speed, at which point it falls into step. The motor then retains its synchronous speed under the action of the principal magnetic field. Thus, automatic starting and subsequent automatic placing in synchronism of this asynchronous hysteresis type motor is ensured.

The series connected coils can be connected either by grouping together the two inputs of each coil, thereby causing the motor to rotate in one direction, or by grouping together the input of one coil and the output of the other coil, in which case the motor will rotate in the opposite direction.

The former 9 is preferably made of aluminum alloy in cases where the motor is to operate on 400 cycle alternating current, or alternatively of copper if the motor is intended to operate with 50 to 60 cycle alternating current.

The very design of this motor allows it to be built very compactly using simple engineering methods. For example, the casing tube 1 has a diameter of less than 12 mm. In which case the bearing and the thrust bearing are preferably jewels or metal bezels which have a reserve supply of lubricant or are of the self-lubricating type. In such cases, the motor can be utilized in time micro-integrators operating with alternating current.

It is of course to be clearly understood that many modifications can be made to the specific embodiment hereinbefore described without departing from the scope of the invention as defined by the appended claims. By way of example, the motor may comprise a different number of poles or be supplied with two-phase current, in which case the two phases would be connected to the windings 10 and 10a respectively.

What I claim is:

1. A synchronizable asynchronous hysteresis type motor having a stator and a rotor, comprising, in combination: a supporting tube; two half-stators respectively housed in said supporting tube, each of said half-stators being formed of two cup-shaped members facing said rotor, made of a magnetic material, centrally joined by a hollow core made of a magnetic material, each of cup-shaped members including a toothed edge portion, each tooth of which forms a pole, said poles of said half-stators being mutually shifted by one polar half-pitch, formers disposed respectively on said cores, coils respectively disposed on said formers, one of said formers being made of an electrically conductive material, the other of said formers being made of an insulating material, bearings in each of said cores, the hollow parts of which are coaxially disposed; a rotor shaft supported in said bearings and housed in said cores, and, on said shaft; a cup-shaped rotor made of steel, said cup-shaped rotor being provided with a rim which is disposed in the vicinity of said poles.

2. The synchronized asynchronous hysteresis type motor as claimed in claim 1, wherein said electrically conductive material is aluminum.

3. The synchronized asynchronous hysteresis type motor as claimed in claim 1, wherein electrically conductive material is copper.

4. The synchronized asynchronous hysteresis type motor as claimed in claim 1, wherein said insulating material is synthetic plastics material belonging to the class of polyacrilic resins.

5. The synchronized asynchronous hysteresis type motor as claimed in claim 1, wherein each coil is adapted to be connected to one phase of a two-phase electric current source.

6. The synchronized asynchronous hysteresis type motor as claimed in claim 1, wherein said coils are adapted to be connected in series to a single-phase electric current source, said series connection being made by grouping inputs of said coils.

7. The synchronized asynchronous hysteresis type motor as claimed in claim 1, wherein said coils are adapted to be connected in series to a single-phase electric current source, said series connection being made by connecting the input of one coil to the output of the other coil.

References Cited by the Examiner

UNITED STATES PATENTS

| | | | |
|---|---|---|---|
| 1,300,859 | 4/1919 | Nikonow | 310—194 |
| 2,081,993 | 6/1937 | Gebhardt et al. | 310—164 |
| 2,191,220 | 2/1940 | Poole | 310—164 |
| 2,300,864 | 11/1942 | Baudry et al. | 310—194 |
| 2,437,142 | 5/1948 | Welch et al. | 310—164 |
| 2,509,583 | 5/1950 | Youhouse | 310—164 |
| 3,092,743 | 6/1963 | Van Utt et al. | 310—162 |

ORIS L. RADER, *Primary Examiner.*

MILTON O. HIRSHFIELD, *Examiner.*